(12) United States Patent
Renwick et al.

(10) Patent No.: US 6,992,269 B2
(45) Date of Patent: Jan. 31, 2006

(54) INJECTION NOZZLE HAVING A HEATED HEAD PORTION

(75) Inventors: Craig Renwick, Georgetown (CA); Denis Babin, Georgetown (CA)

(73) Assignee: Mold-Masters Limited, (CA)

( * ) Notice: Subject to any disclaimer, the term of this patent is extended or adjusted under 35 U.S.C. 154(b) by 208 days.

(21) Appl. No.: 10/358,378

(22) Filed: Feb. 5, 2003

(65) Prior Publication Data
US 2003/0164363 A1  Sep. 4, 2003

Related U.S. Application Data

(60) Provisional application No. 60/354,020, filed on Feb. 5, 2002.

(51) Int. Cl.
B29C 45/20 (2006.01)
(52) U.S. Cl. .................................... 219/426; 425/549
(58) Field of Classification Search ............... 219/424, 219/426, 535; 425/549; 222/146.5; 264/328.15
See application file for complete search history.

(56) References Cited

U.S. PATENT DOCUMENTS

| 4,386,262 A | 5/1983 | Gellert |
| 4,403,405 A | 9/1983 | Gellert |
| 4,492,555 A * | 1/1985 | Schulte ..................... 425/549 |
| 4,666,396 A * | 5/1987 | Shaw ........................ 425/549 |
| 4,771,164 A | 9/1988 | Gellert |
| 4,837,925 A | 6/1989 | Gellert |
| 4,865,535 A | 9/1989 | Gellert |
| 4,911,636 A | 3/1990 | Gellert |
| 4,945,630 A | 8/1990 | Gellert |
| 5,046,942 A | 9/1991 | Gellert |
| 5,135,377 A | 8/1992 | Gellert |
| 5,217,730 A | 6/1993 | Teng |
| 5,235,737 A * | 8/1993 | Gellert ........................ 29/611 |
| 5,266,023 A | 11/1993 | Renwick |
| 5,282,735 A | 2/1994 | Gellert |
| 5,326,251 A * | 7/1994 | Gellert ....................... 425/549 |
| 5,429,491 A | 7/1995 | Gellert |
| 5,437,093 A | 8/1995 | Gellert |
| 5,474,440 A | 12/1995 | Gellert |
| 5,507,635 A | 4/1996 | Gellert |
| 5,614,233 A | 3/1997 | Gellert |
| 5,704,113 A | 1/1998 | Mak |
| 6,009,616 A | 1/2000 | Gellert |
| 6,220,851 B1 * | 4/2001 | Jenko ......................... 425/549 |
| 6,261,084 B1 | 7/2001 | Schmidt ..................... 425/564 |
| 6,323,465 B1 * | 11/2001 | Gellert et al. ............... 219/421 |
| 6,625,873 B1 * | 9/2003 | Gellert ........................ 29/611 |
| 2003/0124216 A1 * | 7/2003 | Guenther et al. ........... 425/549 |

FOREIGN PATENT DOCUMENTS

| EP | 0 546 581 | 6/1993 |
| WO | WO 95/23680 | 9/1995 |

* cited by examiner

Primary Examiner—Joseph Pelham
(74) Attorney, Agent, or Firm—Sterne, Kessler, Goldstein & Fox PLLC

(57) ABSTRACT

An injection nozzle for an injection molding apparatus is provided. The injection nozzle includes a head portion, a body portion and a heater. The head and body portions are connected to each other and together define a nozzle melt channel. The head portion has a head portion outer surface. The head portion is adapted to be in contact with a molding apparatus component that is at a lower temperature than the head portion. The body portion has a body portion outer surface. A groove is defined in the head portion outer surface and the body portion outer surface. The heater wire is positioned in the groove. The heater is adapted to heat melt in the nozzle melt channel.

17 Claims, 6 Drawing Sheets

INJECTION NOZZLE HAVING A HEATED HEAD PORTION

FIELD OF THE INVENTION

This invention relates to injection nozzles for an injection molding apparatus, and more particularly to an injection nozzle having a wrapped-wire heater.

BACKGROUND OF THE INVENTION

It is known for a nozzle in hot runner injection molding apparatuses to include a thermally conductive body portion, a thermally conductive head portion and a heater. Typically, the head portion has a first diameter and the body portion has a second, smaller diameter. A shoulder is the transition region between the head and body portions. The head portion of the nozzle typically seats against a manifold block so that the nozzle can receive melt from runners in the manifold block. Typically, the shoulder abuts a spacer, which in turn, abuts a mold block that contains a plurality of mold cavities. The mold block is typically maintained at a temperature that is significantly below the temperature of the nozzle, in order to cool and solidify melt in the mold cavities.

The heater for the nozzle may be in the form of a wire that is wrapped around the body portion. The heater is typically not wrapped around the head portion. The nozzle however, can lose heat to the mold block through the contact between the head portion and the mold block by means of the spacer. As a result, the temperature of the melt in the head portion is lower than the temperature of the melt at other points along the length of the nozzle. It is generally preferred to have as uniform a temperature as possible for melt along the length of the nozzle, because it reduces the risk of inadvertently burning or otherwise degrading melt in a hotter portion of the nozzle, or of overcooling the melt, which can cause melt flow difficulties, in a cooler portion of the nozzle.

Some nozzles have been proposed to raise the temperature of the melt in the head portion. For example, U.S. Pat. No. 4,771,164 discloses a nozzle having a body portion and a separate head that can be attached to the body portion. A heater wire is wrapped along the length of the body portion including the portion proximate the top end thereof. The head is then attached to the body portion, covering some of the wrapped wire heater. In this way the heater is able to heat the portion of the nozzle melt channel in the top end of the body portion.

There is a continuing need, however, for nozzles having improved heating systems.

SUMMARY OF THE INVENTION

In a first aspect the invention is directed to an injection nozzle for an injection molding apparatus. The injection nozzle includes a head portion, a body portion and a heater. The head and body portions are connected to each other and together define a nozzle melt channel. The head portion has a head portion outer surface. In use the head portion is adapted to be in contact with a molding apparatus component that is at a lower temperature than said head portion. The body portion has a body portion outer surface. A groove is defined in the head portion outer surface and the body portion outer surface. The heater is positioned in the groove. The heater is adapted to heat melt in the nozzle melt channel.

In a second aspect the invention is directed to an injection molding apparatus incorporating at least one injection nozzle described above.

BRIEF DESCRIPTION OF THE DRAWINGS

For a better understanding of the present invention and to show more clearly how it may be carried into effect, reference will now be made by way of example to the accompanying drawings, in which.

DETAILED DESCRIPTION OF THE INVENTION

Figure 1:
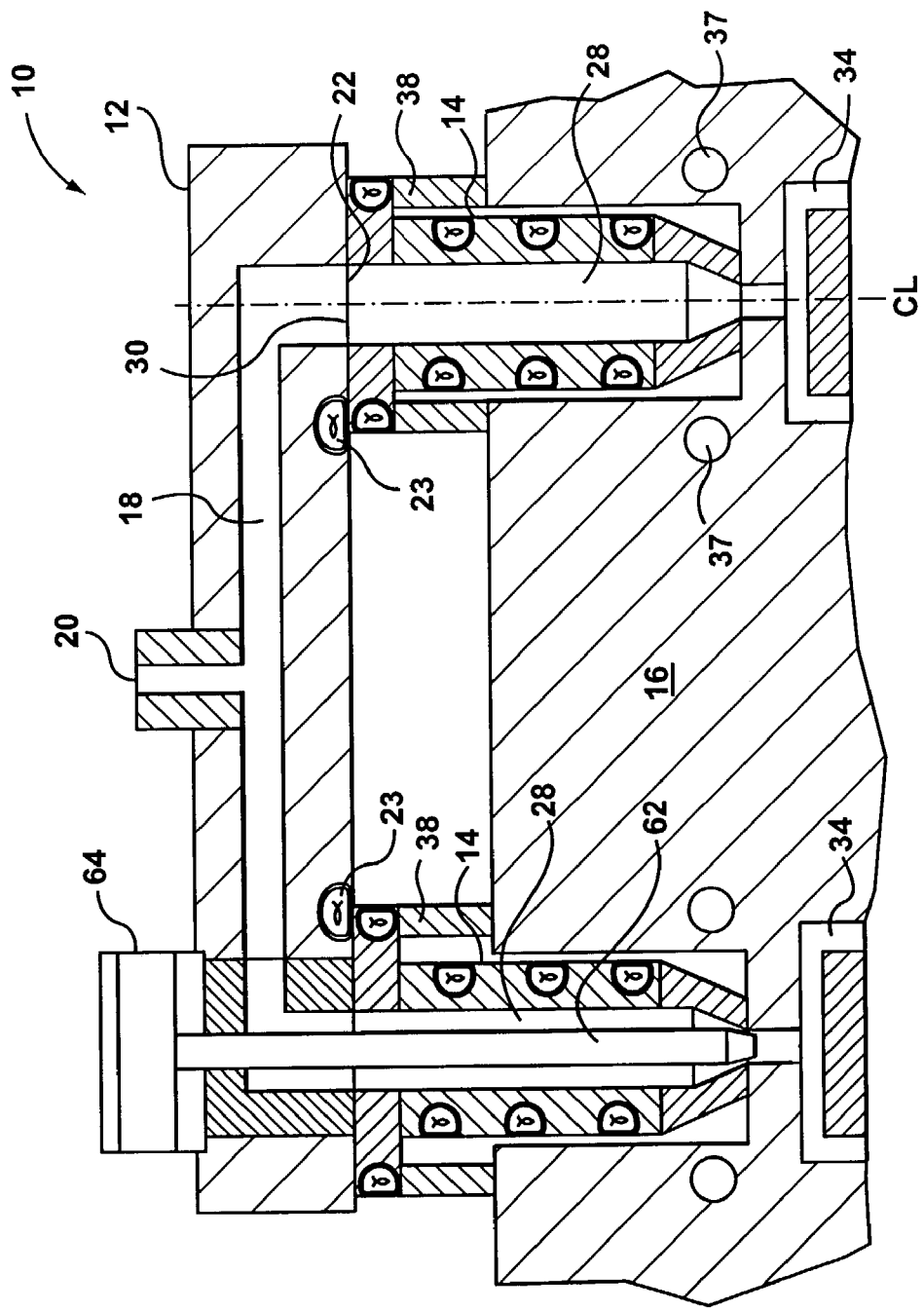
FIG. 1 is a sectional view of an injection molding apparatus having a nozzle in accordance with a first embodiment of the present invention.

Reference is made to FIG. 1, which shows an injection molding apparatus 10, having a manifold block 12, a plurality of nozzles 14 in accordance with a first embodiment of the present invention, and having a mold block 16. The manifold block 12 has a plurality of runners 18 extending therethrough from an inlet 20 to a plurality of outlets 22. The manifold block 12 may include a heater 23 for heating melt in the runners 18.

Figure 2:
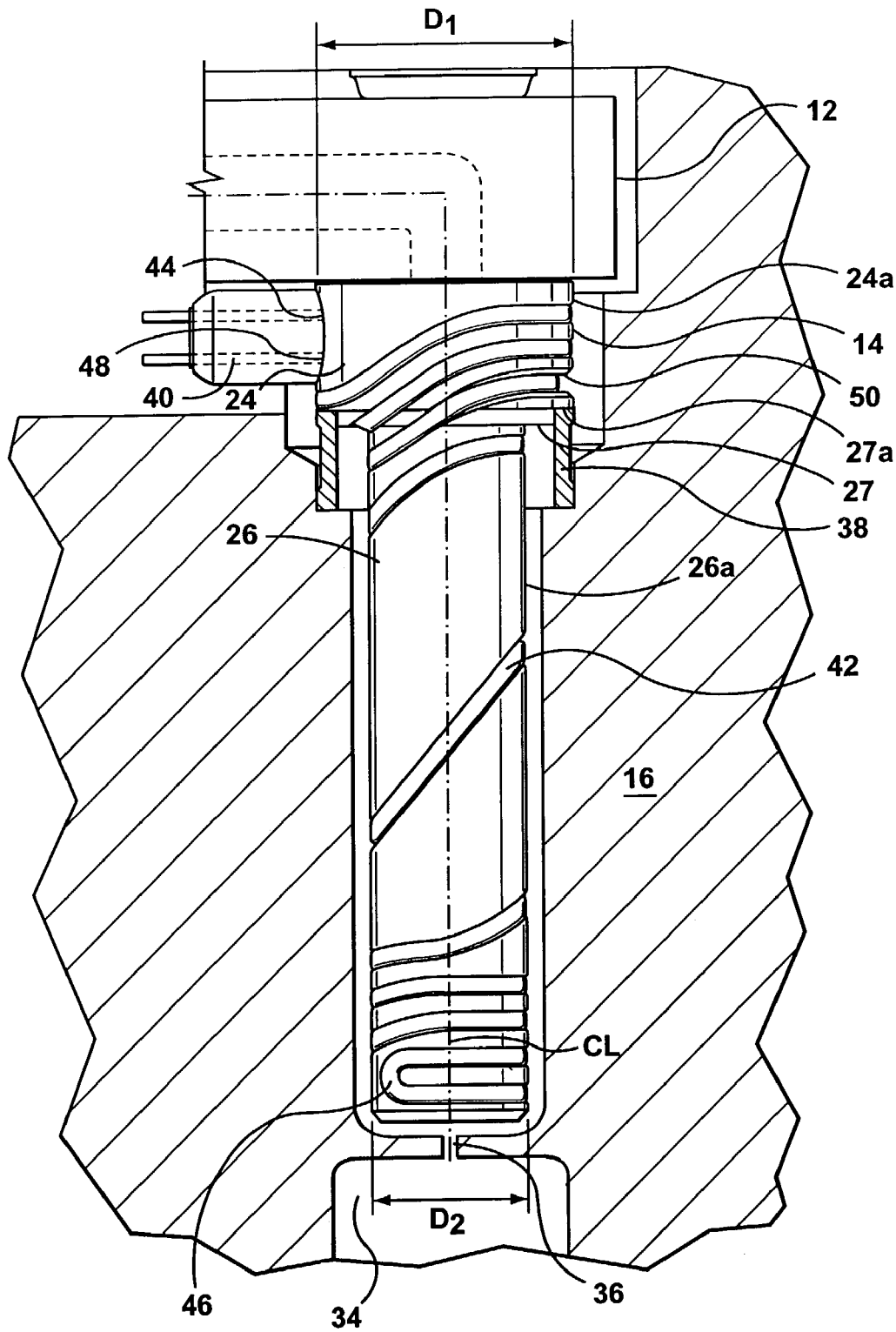
FIG. 2 is a magnified side view of one of the nozzles shown in FIG. 1.

Reference is made to FIG. 2. Each nozzle 14 has a head portion 24 and a body portion 26 which may be integrally joined together, such as by being machined from a single piece of material. The head portion 24 may be generally cylindrical, having a diameter D1. The outer surface of the head portion is shown at 24a.

Like the head portion 24, the body portion 26 may also be generally cylindrical, having a diameter D2. The diameter D1 of the head portion 24 is larger than the diameter D2 of the body portion 26. The outer surface of the body portion 26 is shown at 26a.

In those embodiments where the head and body portions 24 and 26 are cylindrical, a longitudinal axis CL may extend longitudinally at the center of the head and body portions 24 and 26.

The head portion 24 includes a shoulder 27 that extends at any suitable angle between the outer surfaces 24a and 26a of the head and body portions 24 and 26. The shoulder 27 may, for example, be perpendicular to the outer surfaces 24a and 26a of the head and body portions 24 and 26.

The shoulder 27 includes a spacer seat 27a, for receiving a spacer 38. The spacer 38 separates the nozzle 14 from the mold block 16. The spacer 38 may be made from a thermally insulative material, such as titanium, to inhibit heat transfer between the nozzle 14 and the mold block 16.

As shown in FIG. 1, a nozzle melt channel 28 passes through head and body portions 24 and 26, extending from an inlet 30 in the head portion 24, to an outlet 32 in the body portion 26. Head portion 24 abuts against a surface on manifold block 12 so that one of the manifold runner outlets 22 communicates with inlet 30 to nozzle melt channel 28. The nozzle melt channel 28 may be generally longitudinally centered in the head and body portions 24 and 26, ie. the melt channel 28 may extend generally along the axis CL.

Alternatively, the nozzle melt channel 28 may be wholly or partially offset from the axis CL.

Referring to FIG. 1, the mold block 16 includes a plurality of mold cavities 34 in which injection molded articles of formed. Each mold cavity 34 receives melt through a gate 36, which is in communication with the outlet 32 from one of the nozzles 14. The mold block 16 may be cooled by means of a fluid flowing through a plurality of cooling channels 37, to solidify melt in mold cavities 34, thereby forming molded articles (not shown).

Figure 3:
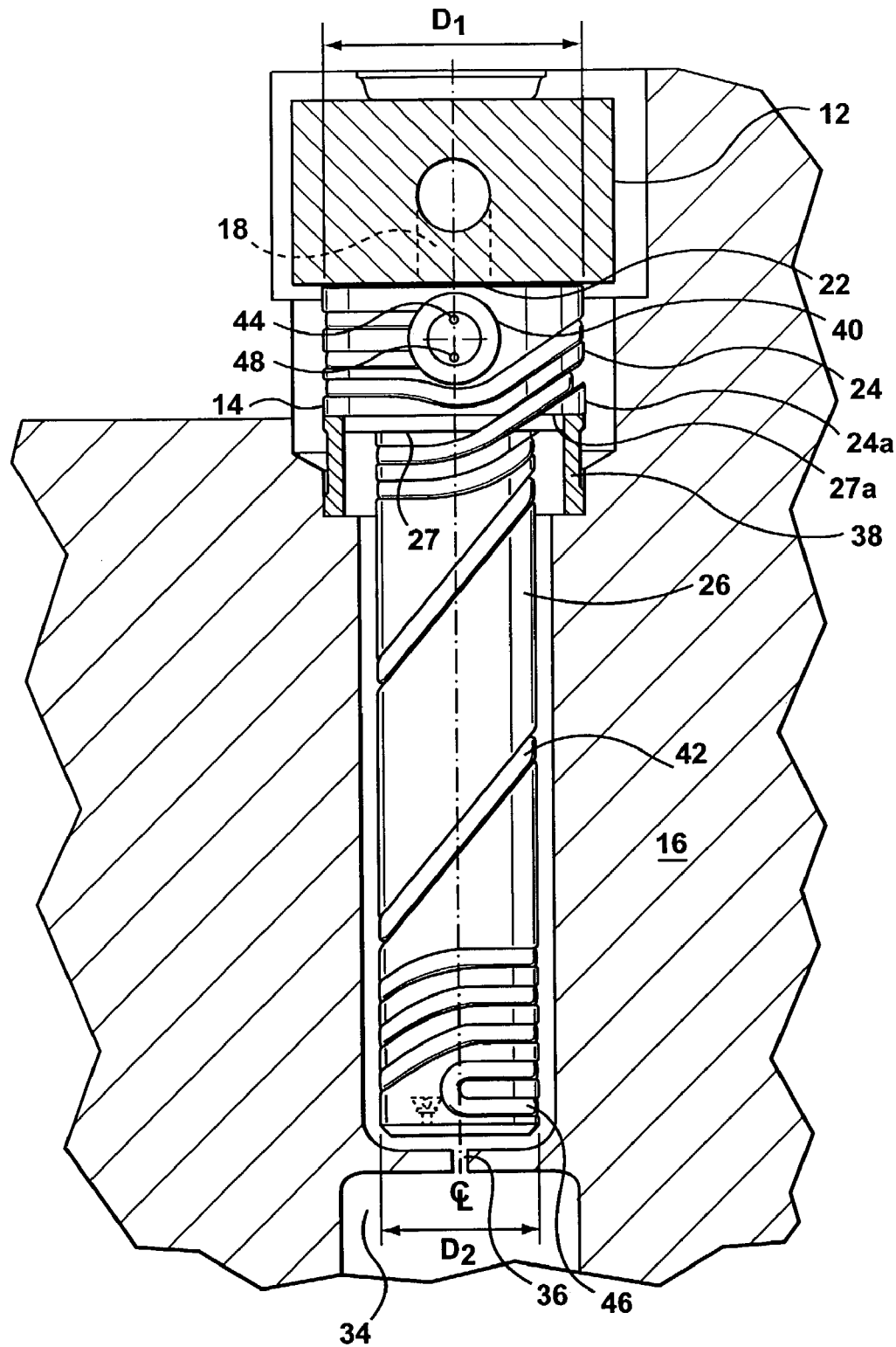
FIG. 3 is a front elevation view of the nozzle shown in FIG. 2.

Referring to FIGS. 2 and 3, each nozzle 14 includes a heater 40 that is wrapped around the head and body portions 24 and 26. Heater 40 may comprise a heater wire 42 that extends from an electrical source (not shown), to an entry point 44 on the head portion 24, around the head and body portions 24 and 26 to a lowermost point 46 on the body portion 26. From the lowermost point 46, the heater wire 42 may double back on itself and may extend back around and up the body and head portions 26 and 24 generally following the path around the nozzle 14 to an exit point 48. The wire 42 then exits from the head portion 24 from exit point 48 and may extend back to the electrical source. The exit point 48 may be positioned adjacent the entry point 44 on the head portion 24 of the nozzle 14.

By making the head and body portions 24 and 26 from a single, integral piece of material, the heat transfer from the heater 40 to the melt channel 28 is better than if the head and body portions are separate pieces, as shown in U.S. Pat. No. 4,945,630. When the head and body pieces are separate, the mating surfaces are separated by an air gap, however small, which acts as a thermal insulator and thus reduces the heat transfer efficiency between the heater and the melt channel.

It will be noted that the entry and exit points 44 and 48 for the heater 40 may be elsewhere on the nozzle 14, than on the head portion 24. For example, the entry and exit points 44 and 48 may be on the body portion 26. Furthermore, the entry and exit points 44 and 48 may be spaced apart by any desired amount, instead of being juxtaposed to each other. For example, the entry point 44 may be on the head portion 24 and the exit point may be on the body portion 26.

Furthermore, the heater 40 may be wrapped around the nozzle 14 along any routing that sufficiently heats melt in the nozzle melt chamber 28. Thus, a generally helical routing is not necessary.

Figure 4:
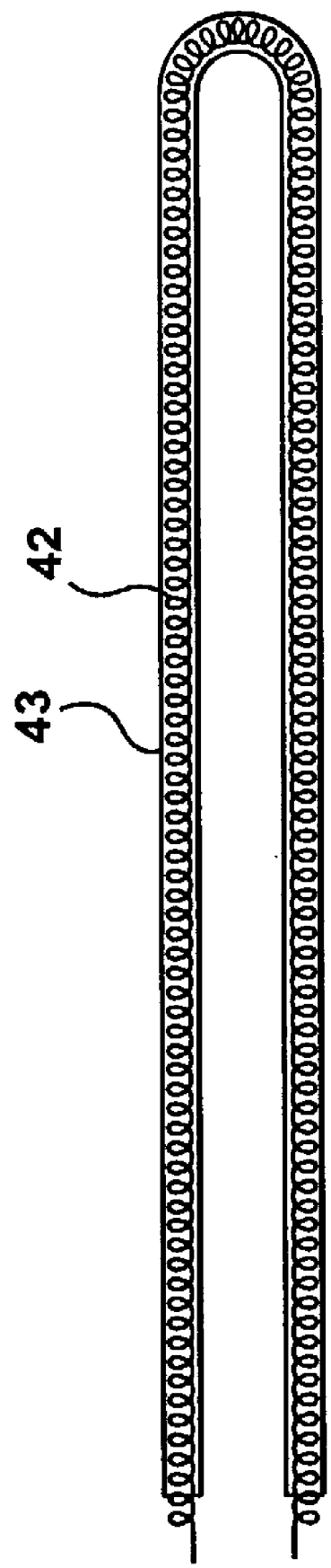
FIG. 4 is a cross-sectional view of a heater element prior to installation on the nozzle shown in FIG. 2.

Reference is made to FIG. 4. The heater wire 42 generates heat through resistance to an electrical current passing therethrough. The heater wire 42 is covered by a sheath 43, which acts as an electrical insulator around the heater wire 42. In general, the amount of heat given off by a heater wire is dependent on its length. A longer heater wire gives off more heat than a shorter heater wire, if other variables are equal, such as the electrical current passing through the longer and shorter wires.

The heater wire 42 may be coiled along some or all of its length to adjust the amount of heat emitted into different portions of the nozzle 14. A given lineal length of heater wire 42 that is coiled generates more heat than does the same lineal length that is uncoiled. The reason is that the given lineal length of coiled wire 42 has more wire than does the given lineal length portion of uncoiled wire.

Figure 5:
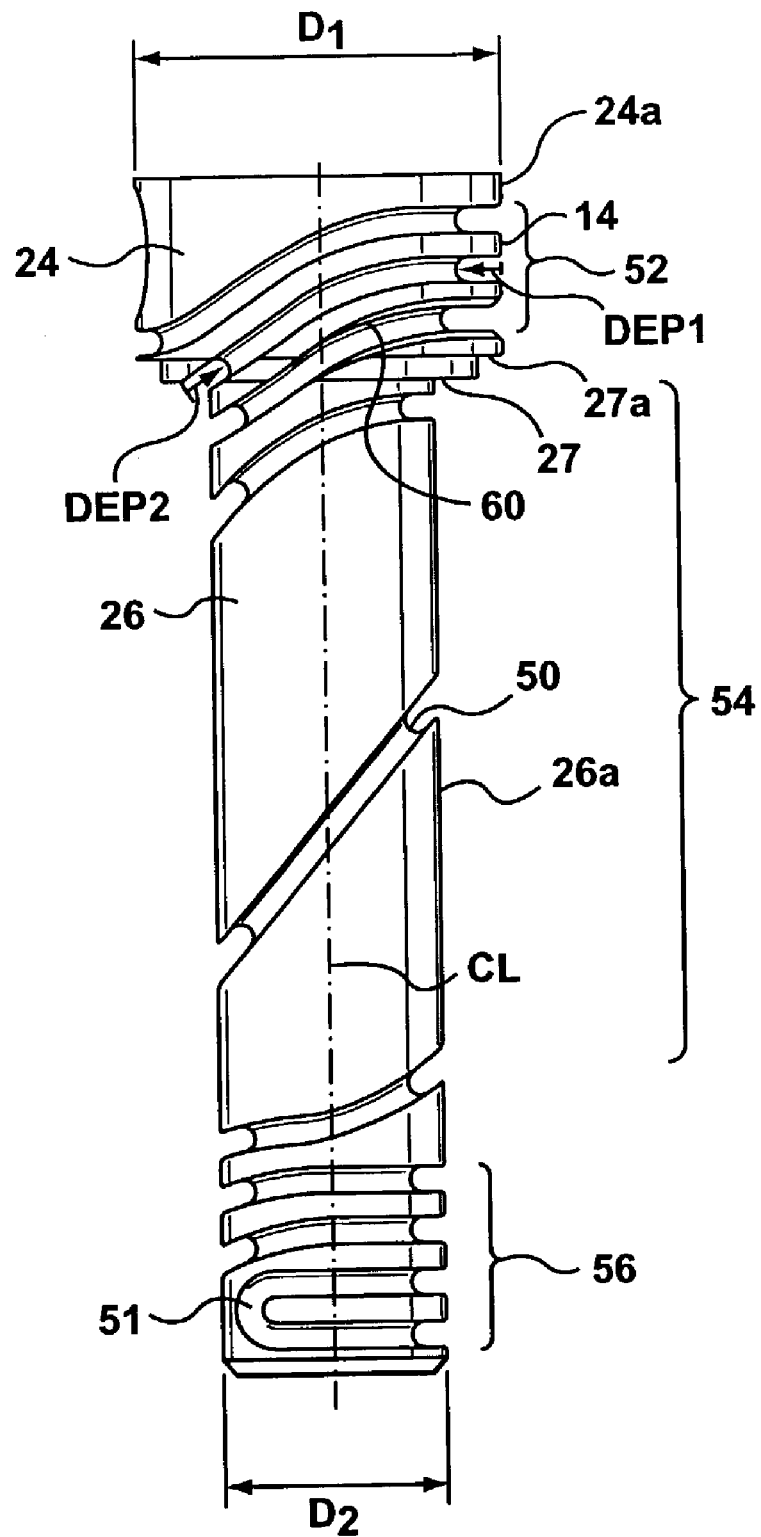
FIG. 5 is a side elevation view of the nozzle shown in FIG. 2 prior to installation of the heater element shown in FIG. 4.

Reference is made to FIG. 5. A groove 50 for receiving heater 40 extends around the periphery of the head and body portions 24 and 26 and may be generally helically configured. The groove 50 starts at the entry point 44, and may travel helically around and down the nozzle head and body portions 24 and 26 to a U-shaped portion 51 where the heater wire 42 may double back on itself at the lowermost point 46.

From the U-shaped portion 51, the groove 50 travels back around and up the head and body portions 24 and 26 to the exit point 48 where the heater wire 42 exits the head portion 24. It is not necessary for the portion of the groove 50 that extends from the entry point 44 to the U-shaped portion 51 and the portion that extends from the U-shaped portion 52 to the exit point 48 to be at a constant offset from each other.

The groove 50 and heater 40 may have a wrap density that varies along the length of the nozzle 14. For example, a first portion 52 of the groove 50 may have a configuration wherein successive wraps of the groove 50 and heater 40 are close together. The high wrap density causes more heat to be generated for transferring into the adjacent portion of the nozzle melt channel 28. A second portion 54 may be provided wherein successive wraps of the groove 50 and heater 40 may be relatively far apart so that less heat is transferred into the adjacent portion of the nozzle melt channel 28. At or near the outlet 32, a third portion 56 may have a wrap density that is increased relative to the second portion 54, so that more heat is transferred into the adjacent portion of the nozzle melt channel 28.

By positioning the heater 40 around the periphery of head portion 24, the length of heater 40 on the head portion 24 is increased, relative to a configuration where the heater 40 is positioned inside a head portion, as shown in U.S. Pat. No. 5,266,023 (Renwick). Comparison tests have been conducted to compare the performance of nozzle 14 having he heater wrapped around the periphery of the head portion 24, with a nozzle having a heater embedded within the head, similar to the configuration shown in U.S. Pat. No. 5,266,023. The test consisted of taking temperature measurements of the melt channel in the head portions of both nozzles (ie. the nozzle 14 and the nozzle with the embedded heater). The temperature measurements showed that positioning the heater 40 about the periphery of the head portion 24 increases the temperature of the melt, relative to a configuration with the embedded heater. Surprisingly, the temperature measurements showed this to be true even if the overall length of the heater on the head portion 24 is the same as the overall length of the heater 40 that is embedded in the head portion of the comparison nozzle. In order to make the overall length of the heater 40 the same as the heater that is embedded, the heater 40 had fewer windings about the head portion 24, and yet the heater 40 still transferred more heat to the melt channel than did the embedded heater.

The groove 50 may transition from the head portion 24 to the body portion 26 by means of a slot portion 60. Slot portion 60 is a slot that is milled, or otherwise made, through the head portion 24 into the nozzle 14 to the level of the body portion 26. The slot portion 60 may extend between the head and body portions 24 and 26 in any suitable manner. Slot portion 60 may extend at any suitable angle, or may alternatively extend directly longitudinally, between the head and body portions 24 and 26. As a further alternative, the slot portion 60 may extend helically around and longitudinally down between the head and body portions 24 and 26. In the embodiment shown in FIG. 2, where the head and body portions 24 and 26 are separated by the transverse shoulder 27, the slot portion 60 has a depth into the surface of the head portion 24 that increases from a depth DEP1 of the groove 50 about the periphery of the head portion 24 until a depth DEP2 is reached. At the depth DEP2, the slot portion 60 is radially spaced from the axis CL of the head and body portions 24 and 26 by the same amount as the portion of groove 50 along the body portion 26.

In an alternative embodiment (not shown), the groove 50 may be made to accommodate both the portion of the heater wire 42 extending from the entry point 44 to the lowermost point 46 and the portion extending from the lowermost point 46 to the exit point 48. In this embodiment, the portions of the heater wire 42 may be side-by-side in the groove 50 or they may be positioned one-over-the-other, i.e. wherein one portion of the heater wire 42 covers the other portion in the groove 50.

Figure 6:
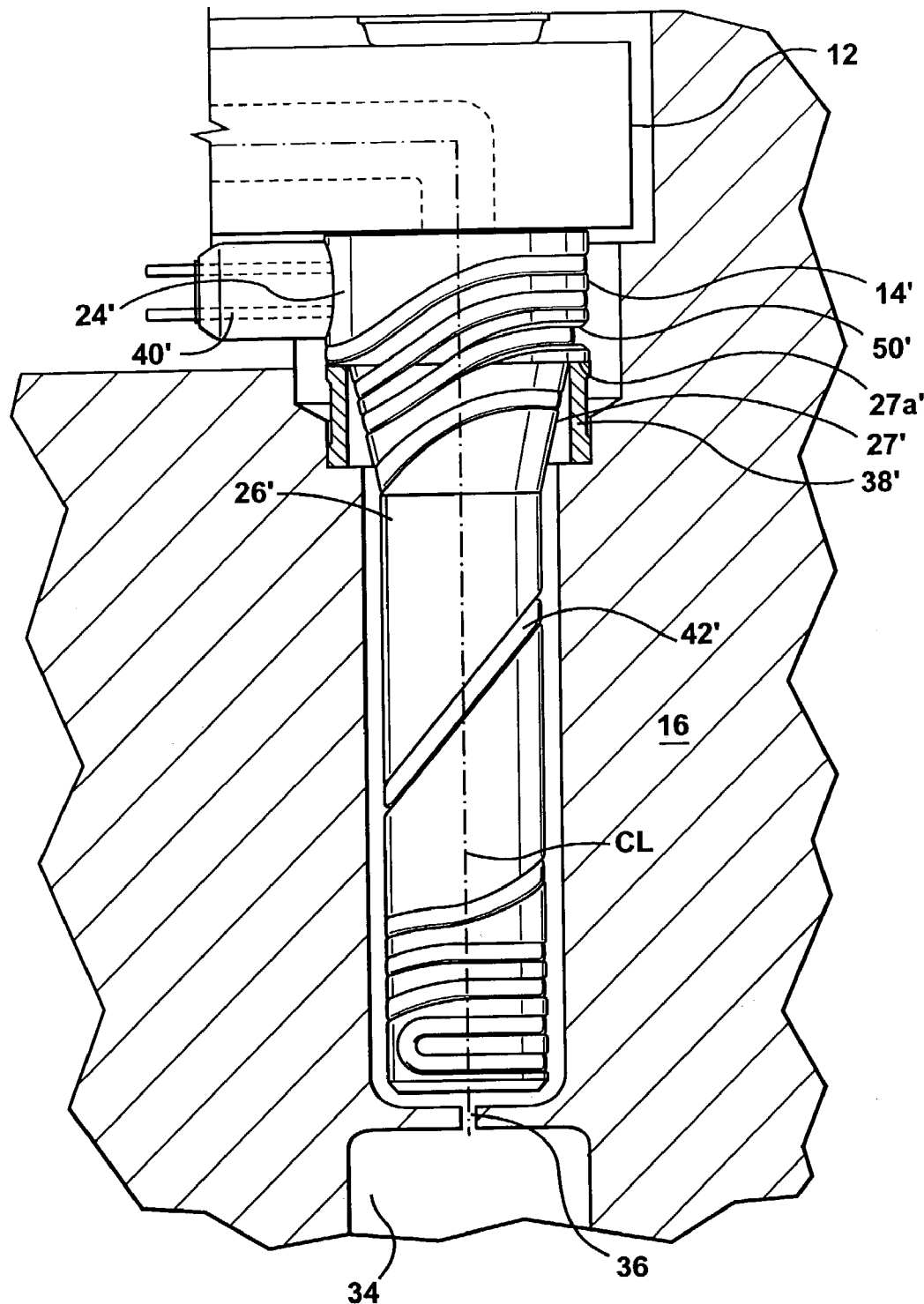
FIG. 6 is a side view of a another embodiment of a nozzle according to the present invention.

Reference is made to FIG. 6, which shows a nozzle 14' which is a variant of the nozzle 14, shown in FIG. 2. It will be noted that in the embodiment shown in FIG. 6, items that are analogous to those in the embodiment shown in FIG. 2, are noted with analogous reference numerals. The nozzle 14' has a shoulder 27' between an outer surface 24a' on a head portion 24', and an outer surface 26a' on a body surface 26'. The shoulder 27' extends obliquely between the outer surfaces 24a' and 26a', instead of being transverse to them. In the embodiment shown, wherein the head and body portions 24' and 26' are generally cylindrical, the shoulder 27' may be generally conical in shape. The shoulder 27' may have a seat 27a' thereon for receiving a spacer 38' that spaces the nozzle 14' from the mold plate 16. The nozzle 14' includes a heater 40', which may include a resistive heater wire 42' that is wrapped around the head and body portions 24' and 26' in a groove 50'.

Reference is made to FIG. 1. Nozzle 14 may include an optional valve pin 62. Valve pin 62 may be movable within the nozzle melt channel 28 by means of an actuator 64. Alternatively, valve pin 62 may be stationary. Alternatively, the nozzle 14 may be thermally gated and thus not include a valve pin.

In use, melt passes from a melt source (not shown), through the inlet 20, through runners 18, through nozzle melt channels 28, through gate 36 and into melt cavities 34.

It will be appreciated that nozzles 14 may be used with configurations of injection molding apparatus, other than that shown in FIG. 1. For example, nozzles 14 may be used with injection molding apparatuses having a single mold cavity. Nozzles 14 may also be used with co-injection molding apparatuses that have a plurality of manifold blocks 12. Nozzles 14 may also be used with stack-mold machines.

It has been described that the head and body portions may be integrally joined together, such as by being machined from a single piece of material. It is alternatively possible that the head and body portions are made from two or more pieces that are joined together. Preferably, a thermally conductive material is introduced to penetrate between and cover any pairs of mating surfaces that are positioned between the heater and the nozzle melt channel. Preferably, this thermally conductive material substantially occupies the entirety of any gap between any pairs of mating surfaces, and acts as a thermal bridge therebetween, to reduce any loss of heat transfer efficiency therebetween.

It is alternatively possible for the head and body portions to be two separate pieces, that are not integrally joined together as described above.

While the above description constitutes the preferred embodiments, it will be appreciated that the present invention is susceptible to modification and change without departing from the fair meaning of the accompanying claims.

What is claimed is:

1. An injection nozzle for an injection molding apparatus, comprising:
    a one-piece nozzle having a cylindrical head portion with a substantially constant outer diameter, a body portion, and a nozzle melt channel that extends therethrough, wherein said head portion has a head portion outer surface and said body portion has a body portion outer surface, wherein said head portion outer surface and said body portion outer surface have a helical groove defined therein; and
    a heater positioned within said helical groove such that said heater extends about a periphery of said head and body portions to heat melt in said nozzle melt channel, wherein said head portion and said body portion extend in a longitudinal direction and said head portion is larger in transverse cross-section than said body portion.

2. The injection nozzle of claim 1, wherein said head portion includes a shoulder, said shoulder extending from said head portion outer surface to said body portion outer surface, wherein at least a portion of said shoulder is thermally isolated from a mold plate via a spacer.

3. The injection nozzle of claim 1, wherein said heater includes a heater wire, wherein at least a portion of said heater wire is coiled.

4. The injection nozzle of claim 1, wherein a depth of said groove in said head portion is a first distance from a longitudinal axis of said nozzle melt channel and the depth of said groove in said body portion is a second distance from the longitudinal axis of said nozzle melt channel.

5. The injection nozzle of claim 4, wherein said groove depth is substantially constant along the length of the nozzle.

6. The injection nozzle of claim 5, wherein said groove depth accommodates only a width of a heater wire of said heater.

7. The injection nozzle of claim 5, wherein said groove depth is sized to accommodate no more than double a width of a heater wire of said heater.

8. The injection nozzle of claim 4, wherein said first distance is greater than said second distance.

9. An injection nozzle for an injection molding apparatus, comprising:
    a one-piece nozzle having a cylindrical head portion with a substantially constant outer diameter, a body portion, and a nozzle melt channel that extends therethrough, wherein said head portion has a head portion outer surface and said body portion has a body portion outer surface, wherein said head portion outer surface and said body portion outer surface have a helical groove defined therein; and
    a heater positioned within said helical groove such that said heater extends about a periphery of said head and body portions to heat melt in said nozzle melt channel, wherein said groove has a groove length and said groove has a groove depth that increases at a transition between said body portion and said head portion.

10. The injection nozzle of claim 9, wherein said head portion includes a shoulder, said shoulder extending from said head portion outer surface to said body portion outer surface, wherein at least a portion of said shoulder is thermally isolated from a mold plate via a spacer.

11. The injection nozzle of claim 9, wherein said heater includes a heater wire, wherein at least a portion of said heater wire is coiled.

12. The injection nozzle of claim 9, wherein a depth of said groove in said head portion is a first distance from a longitudinal axis of said nozzle melt channel and the depth of said groove in said body portion is a second distance from the longitudinal axis of said nozzle melt channel.

13. The injection nozzle of claim 12, wherein said first distance is greater than said second distance.

14. An injection molding apparatus, comprising:
a manifold block, said manifold block defining at least one runner therethrough, said runner being adapted to be downstream from and in fluid communication with a melt source; and
at least one injection nozzle including a cylindrical head portion, a body portion and a heater,
wherein said head and body portions are one piece, said head and body portions together define a nozzle melt channel, said head portion has a head portion outer surface and said body portion has a body portion outer surface, and wherein a groove is defined in said head portion outer surface and said body portion outer surface,
and wherein said heater is positioned within said groove such that said heater extends about a periphery of said head and body portions to heat melt in said nozzle melt channel,
and wherein said head portion and said body portion extend in a longitudinal direction and said head portion has a substantially constant outer diameter and is larger in transverse cross-section than said body portion.

15. The injection molding apparatus of claim 14, wherein said groove has a groove depth that increases in a transition area between said head and body portions.

16. The injection molding apparatus of claim 14, wherein said head portion includes a shoulder, said shoulder extending from said head portion outer surface to said body portion outer surface, and wherein at least a portion of said shoulder is thermally isolated from a mold component via a spacer made of a thermally insulative material.

17. The injection molding apparatus of claim 14, wherein said heater includes a heater wire, wherein at least a portion of said heater wire is coiled.

* * * * *